Figure 1:
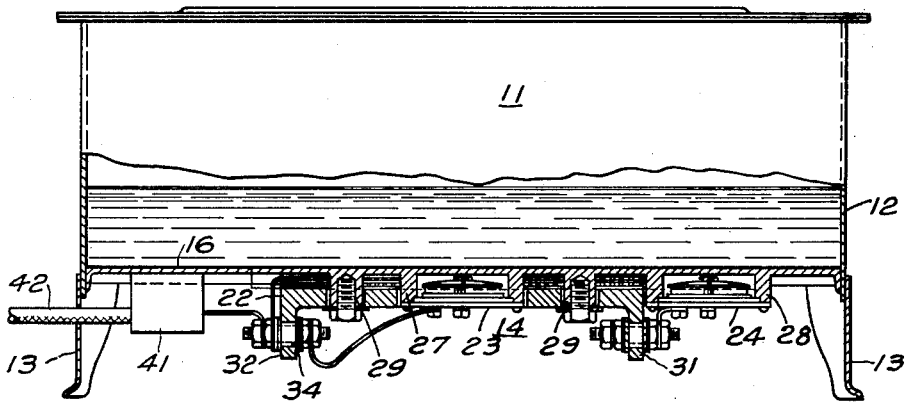

July 31, 1928.

I. G. THOMAS 1,678,885

THERMOSTATICALLY CONTROLLED HEATING UNIT

Filed March 10, 1927

WITNESSES:

INVENTOR
Irvin G. Thomas.
BY
ATTORNEY

Patented July 31, 1928.

1,678,885

UNITED STATES PATENT OFFICE.

IRVIN G. THOMAS, OF MANSFIELD, OHIO, ASSIGNOR TO WESTINGHOUSE ELECTRIC & MANUFACTURING COMPANY, A CORPORATION OF PENNSYLVANIA.

THERMOSTATICALLY-CONTROLLED HEATING UNIT.

Application filed March 10, 1927. Serial No. 174,147.

My invention relates to heated devices and particularly to thermostatically controlled heating units therefor.

An object of my invention is to provide a heating unit for heating materials, fluids, etc., comprising a plurality of heating elements that shall have thermostatic means embodied therein for intermittently de-energizing and re-energizing certain of said heating elements, thereby reducing and increasing the heat-generating capacity of the heating unit accordingly, when the temperature of the materials, fluids, etc., has attained relatively high and low predetermined values, respectively.

A further object of my invention is to provide a heating unit for heating materials, fluids, etc., comprising a plurality of heating elements that shall have thermostatic means embodied therein for de-energizing all of said heating elements when the temperature obtaining in the heating unit is of a maximum safe value.

And a still further object of my invention is to provide a heating unit for heating materials, fluids, etc., comprising a plurality of heating elements, that shall have a plurality of thermostatic circuit-controlling devices operable at different temperatures for controlling the degree of energization of said heating elements, whereby all of the heating elements may be energized to heat the said materials, fluids, etc., to a predetermined temperature value in a relatively short period of time, and, upon the attaining of said temperature, one of said thermostats shall be operable to de-energize certain of said heating elements, thus reducing the power input to said heating unit to such value that said predetermined temperature shall be maintained, and another of said thermostats shall become operable to de-energize all of said heating units only when the temperature of said heating unit has attained a maximum temperature of a relatively high predetermined value.

In practicing my invention, I provide a thermostatically controlled heating unit for heating liquids and other materials to a temperature of a predetermined value in a relatively short period of time. At the end of this period, the power input is materially reduced by thermostatic means to such value that the aforesaid temperature is maintained.

The heating unit comprises, in general, a member or plate having a plurality of resistor elements distributed over a portion of its surface and a plurality of thermostatic switches for controlling the energization of the resistor elements.

One of the thermostatic switches is responsive to that portion of the plate covered by the resistor elements and is operable to de-energize all of the elements when a temperature of a relatively high value obtains therein, in order that the heating unit may not be heated to destructive or injurious temperatures.

Another of the thermostatic switches is located in close proximity to another portion of the plate, the temperaure of which is affected primarily by the temperature of the material to be heated thereby and secondarily by the temperature of the resistor elements. The last named thermostat operates to reduce the power input to the resistor elements when the temperature of the material increases to a predetermined value and to increase the energization when its temperature falls to a certain low value. Thus, the second thermostat operates to maintain the material at a substantially constant average temperature, while the first thermostat, being responsive to a higher temperature, operates to prevent over-heating of the plate and the resistor elements embodied in the heating unit.

Figure 2:
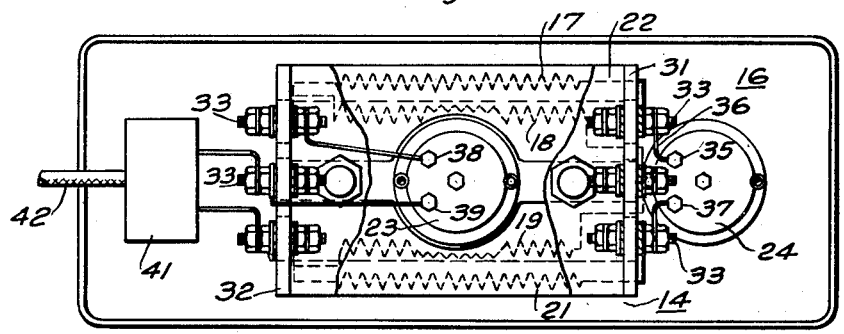
Figure 3:
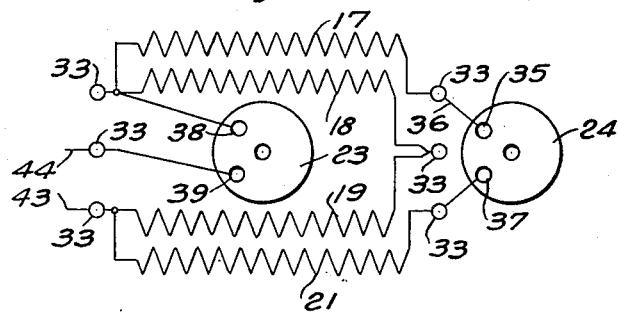

In the single sheet of drawings,

Figure 1 is a view, partly in side elevation and partly in section, of a device embodying my invention, Fig. 2 is a bottom plan view, portions thereof being removed, of the same device, and Fig. 3 is a view illustrating, schematically, the manner in which a plurality of thermostatic switches embodied in my invention are connected to control the energization of the resistor elements employed.

With reference to Figs. 1 and 2, of the drawings, an electrically heated device 11 is illustrated that comprises a container 12 supported by a plurality of legs 13 and a thermostatically controlled heating unit 14, which unit, in a preferred form of my invention, constitutes the base of the container 12.

The heating unit comprises a member or plate 16, a plurality of resistor elements 17, 18, 19 and 21, a clamping plate 22 and a pair of thermostatic switches 23 and 24. The plate 16 constitutes the base of the container 12 and may be secured to the sides thereof by soldering or welding to thus provide a water-tight joint between the sides of the container and the edges of the plate. The under side of the plate 16 is provided with a pair of annular bosses 27 and 28, into which the thermostatic switches 23 and 24 are inserted, and a pair of tapped lugs 29.

The resistor elements 17 to 21, inclusive, are preferably distributed uniformly over a desired area extending around the annular boss 27 and the lugs 29 so that an area somewhat less than the area of the plate 22 is in thermal contact with the resistor elements. The clamping plate 22 conforms in shape to the area enclosed by the resistor elements 17 to 21, inclusive, and is provided with apertures through which the annular boss 27 and the lugs 29 may project. The clamping plate 22 may be secured to the plate 16 by such suitable means as bolts and washers, whereby the resistor elements 17 to 21, inclusive, may be tightly clamped against the plate 16. It is to be understood that the resistor elements 17 to 21, inclusive are electrically insulated from the plates 16 and 22, respectively.

The respective ends of the plate 22 are provided with lugs 31 and 32 that project downwardly herefrom. A plurality of terminal bolts 33 are provided that extend through apertures 34 in the lugs 31 and 32 and are suitably secured thereto and insulated therefrom.

Corresponding ends of the resistor elements 17 and 21 are secured to the terminal bolts 33 adjacent the ends of the lugs 32, and the other ends thereof are secured to terminal bolts 33 adjacent to the outer edges of the lug 31. Corresponding ends of the resistor elements 18 and 19 are secured to the terminal bolts 33 adjacent the ends of the lug 32, and the other ends thereof are secured to the middle terminal bolts 33 carried by the lug 31.

Thus one of the ends of each of the resistor elements 18 and 19 is secured to the middle terminal bolt on lug 31, and the other ends of the elements 17, 18, and both ends of resistors 19 and 21 are secured to the outer terminal bolts 33 located on the respective lugs 31 and 32.

One end of the resistor element 17 is connected to a terminal 35 of the thermostatic switch 24 by means of a connector 36 that is attached to one of the terminal bolts 33 on lug 31. Another terminal 37 of the same switch is connected to the other terminal bolt 33 that is located also on the lug 31. One terminal 38 of the thermostatic switch 23 is connected to the terminal bolt 33 located on lug 32 to which the ends of the resistor elements 17 and 18 are connected, and another terminal 39 thereof is connected to the middle terminal bolt 33 located on the same lug 32.

The middle terminal bolt 33 located on lug 32 and one of the outer terminal bolts thereon, are connected to a terminal block (not shown), that is disposed within a receptacle 41. The terminal block located within the receptacle 41 may then be connected to any suitable source of electromotive force by means of a cable 42 having current conductors embodied therein.

The thermostatic switches 23 and 24 are normally in a circuit-closing position, provided the temperature of plate 16 is below a predetermined value and, when in these positions, resistor elements 17 and 21 are electrically connected in parallel with resistor elements 18 and 19, (see Fig. 3). When the thermostatic switch 24 is in a circuit-opening position, the resistor elements 17 and 21 are open-circuited, thereby leaving the elements 18 and 19 in series-circuit relation with each other to be energized from a suitable source of electromotive force through the conductors 43 and 44 which may be embodied in the cable 42. If the temperature to which the thermostatic switch 23 is subjected exceeds a certain value it is caused to be actuated to a circuit-opening position, thereby de-energizing all of the resistor elements 17 to 21, inclusive.

The annular bosses 27 and 28 serve to enclose or shield the thermostatic switches from heat radiated by the resistor elements 17 to 19 and 21 in order that the switches may be responsive to the surface temperature of the plate 16 and be affected by conducted heat therefrom. Since the switch 24 is located inside of the area enclosed by the resistor elements, it will respond substantially to the temperature of the surface of the plate 16 directly above it, which temperature will be approximately equal to that of a fluid or other substance disposed over the surface thereof. Thus, it is apparent that the temperature of the switch 24 is affected indirectly by the temperature of the resistor elements and directly, or substantially so, by the temperature of plate 16 surrounding the boss 28.

Likewise, the boss 27 shields the switch 23 from heat radiated by the resistor elements disposed therearound, in order that it may be responsive to the temperature of that portion of the plate 16 in immediate contact with the resistor elements. The switch 23 being adjusted to be operable at a higher temperature than the switch 24, it is evident that, in the event the resistor elements 17 to 19 and 21, inclusive, are energized when the surface of the plate 16 is dry or uncovered and exposed to the air, the switch 23 will be heated to its operating temperature to effect de-energization of all of the heating elements before the switch 24 has attained its operating temperature, thereby protecting the heating unit 11 from excessive or destructive temperatures.

The thermostatic switches 23 and 24 are of the type disclosed in Patent No. 1,448,240, to Spencer.

For purposes of illustration, it may be assumed that the switch 24 is operative to open an electric circuit comprising the resistor elements 17 and 21 when the temperature to which it is subjected is substantially equal to say 212° F., and that the thermostatic switch 23 is operable at a relatively higher temperature to interrupt the electric circuit comprising the resistor elements 17 to 19, and 21, when the temperature to which it is subjected is substantially equal to say 230° F.

If the container 12 be filled with a quantity of water or other liquid and the heating units 17 to 19 and 21, inclusive, be energized from a suitable source of electromotive force, it may be further assumed that the temperature of the water will increase to a value of say 212° by the time that the thermostatic switch 24 has been heated to its operating temperature to effect de-energization of the resistor elements 17 and 21. The energy input to the heating unit 14 is, therefore, reduced, but, since the heat-generating capacity of the elements 18 and 19 is of such value, by design, that the temperature of the water is maintained at the boiling-point temperature, the switch 24 remains in the circuit-interrupting position.

If, however, metallic instruments, such as are used by members of the medical profession, are placed in the water to be sterilized in such quantities that temperature of the water is decreased to a value materially below the boiling point, the temperature of the switch 24 is thereby lowered to that value at which it is actuated to its circuit making position, thereby effecting re-energization of resistor elements 17 and 21. Upon the re-energization of the elements 17 and 21, the temperature of the water will again increase to such value that the switch 24 functions to de-energize the resistor elements 17 and 21.

If the heating unit 14 is continuously energized for a long period of time, or for such a period as will cause the water within the container 12 to be completely evaporated, thus leaving the surface of the plate 16 in a dry condition, the plate will tend to be heated to a value much higher than 212° F. But, as the thermostatic switch 23 is closely associated with the heating unit 14 and the surface of the plate 16 heated by the resistor elements 17 to 21, inclusive, it will be heated to its operating temperature, whereby the entire heating unit 14 will be de-energized. Thus, over-heating of the heating unit 14 and melting of the solder or other material used to provide a water-tight joint, where the base of the container 12 and the plate 16 are united, is prevented.

If it should so happen that the resistor elements 17 to 19 and 21 be energized when the container 12 is empty of water, substantially all the heat generated thereby is absorbed or retained by the heating unit 14, with an accompanying increase of temperatures. It is evident that the area in immediate contact with the resistor elements will be heated to a relatively high temperature before the temperature of the surrounding area has been materially affected. Therefore, since the switch 23 is positioned within the immediate area in contact with the resistor elements, it will be heated to its operating temperature and effect de-energization of all the resistor elements before the temperature of the heating unit 14 has attained a destructive value and even before the switch 24 has attained its operating temperature.

Thus, the switch 24 operates to maintain a uniform temperature within the liquid contained in the container 12. The switch 23 being directly or closely associated with the surface heated by the resistor elements 17 to 21 and being subjected to the heating effect of the resistor elements, it functions to de-energize all of the resistor elements when the liquid or other material heated within the container is removed. It, therefore, prevents overheating of the plate 16 and the heating unit comprising the resistor elements 17 to 21.

By my invention, I have provided a thermostatically controlled heating unit for an electrically heated device, which comprises, in general, the base of a container, a clamping plate, a plurality of resistor elements secured therebetween, and a pair of thermostatic switches disposed in thermal relation to the plate for controlling the energization of the heating elements. One of the thermostatic switches is influenced directly by the resistor elements and is operable to de-energize the entire heating unit when the base of the container exceeds a certain temperature. The other thermostatic switch, being effected directly by the material heated by the heating unit and being operable at a lower temperature, functions to maintain a substantially constant temperature in the material to be heated by the heating unit.

Various modifications may be made in the device embodying my invention, without departing from the spirit and scope thereof. I desire, therefore, that only such limitations shall be placed thereon as are imposed by the prior art and the appended claims.

I claim as my invention:

1. The combination with a container and a heating unit therefor comprising a plurality of resistor elements, of a thermostatic switch for automatically controlling the energization of certain of said elements in response to the temperature of a fluid contained in said container, means for preventing direct flow of heat from the heating unit to the first thermostatic switch, and a second thermostatic switch responsive to a portion of said heating unit located in immediate proximity of said heating unit for deenergizing all of said resistor elements when a temperature higher than the first temperature obtains.

2. The combination with a container, a heating unit therefor, and a thermostatic device responsive to the temperature of material heated in said container for intermittently decreasing and increasing the energization of said heating unit, of a second thermostatic device responsive to the temperature of that portion of the container disposed in thermal contact with the heating unit for de-energizing said heating unit when a relatively high temperature obtains in the heating unit.

3. A thermostatically controlled heating unit for a container comprising a member constituting the base of the container, a heating element covering a portion of said member, a thermostatic switch responsive to the temperature of said portion for deenergizing said heating unit when a relatively high temperature obtains in said portion, and a second thermostatic switch responsive to the temperature of another portion of said member, said second thermostatic switch being effective to reduce the power input of said heating unit when a temperature lower than said relatively high temperature obtains.

4. The combination with a container, a heating unit therefor, said heating unit comprising a member constituting the base of the container, and heating means secured to said member, of a thermostatic switch responsive to the temperature of an area heated by said heating means for deenergizing said heating means when a relatively high temperature obtains in said area, and a second thermostatic switch for decreasing the energization of said heating means, said second switch being responsive to the temperature of a portion of the said base member not in direct contact with the heating means.

5. A thermostatically controlled heating unit for heating material in a container, said heating unit comprising resistor elements, a thermostatic switch responsive to temperature of the material in the container for intermittently decreasing and increasing the energization of said heating unit to thereby maintain said material at an average temperature of a predetermined value, and a second thermostatic switch responsive to the portion of the container in contact with the resistor elements for de-energizing said elements when a relatively high temperature obtains in that portion of the container.

6. The combination with a fluid container having a bottom portion and an electric heating unit engaging said bottom portion, of a plurality of thermally actuable switches for controlling the energization of the heating unit, said switches being located against said bottom portion and in different thermal relations relatively to the heating unit, the switch located in closer thermal relation to the heating unit being effective to interrupt the energization of the heating unit if the container is heated thereby with no fluid therein and the other switch being effective to deenergize a portion only of said heating unit.

In testimony whereof, I have hereunto subscribed my name this second day of March, 1927.

IRVIN G. THOMAS.